United States Patent Office 3,611,651
Patented Oct. 12, 1971

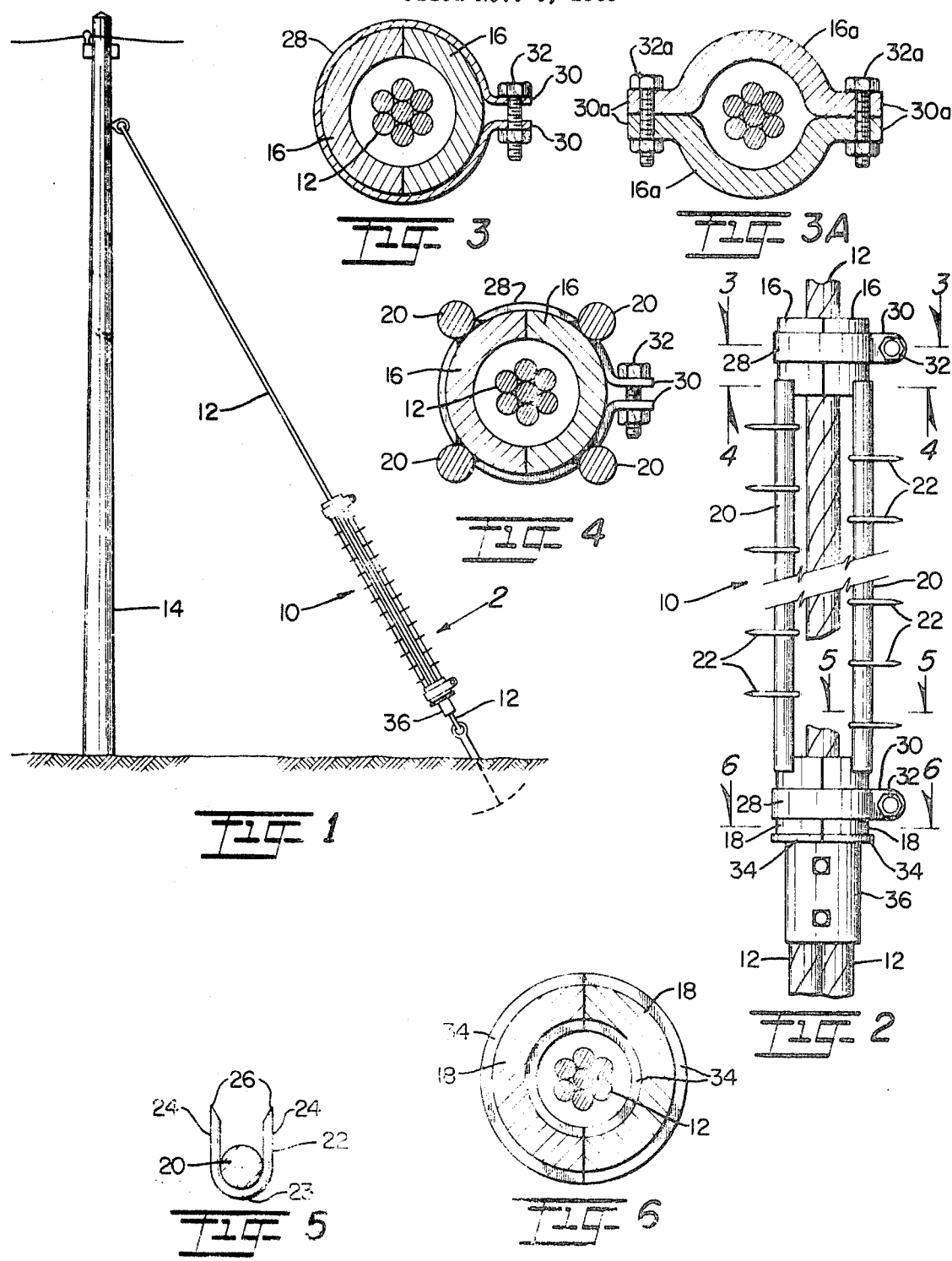

3,611,651
GUY WIRE ANIMAL GUARD
Gaynor Carlson, R.F.D. 1, Herndon, Kans. 67739
Filed Nov. 3, 1969, Ser. No. 873,166
Int. Cl. A01k 3/00
U.S. Cl. 52—101
12 Claims

ABSTRACT OF THE DISCLOSURE

An animal guard adapted to be applied to the lower end of a guy wire disposed in an animal enclosure, without disturbing the anchors at the ends of the guy wire characterized by a two-part construction each having semi-circular ends, which may be clamped together after application to the guy wire, the ends being joined by longitudinal rods having barbs on same, the unit being freely rotatable on the guy wire after being applied thereto.

BACKGROUND OF THE INVENTION

It is well known that animals, such as cattle, horses, and others, often seek objects against which they may scratch or ruff their hides. It is also well known that wire fences, provided with barbs or tines, are effective to repel such animals since they soon recognize that contact of their bodies with same produces undesired pricking or impalement of their hides by the barbs. Often, however, a fenced enclosure, such as a pasture, contains angularly disposed guy wires which brace adjacent power or telephone poles, the guy wires conventionally being formed as stranded cables having a relatively smooth surface, against which an animal may apply force and move relative to same to ruff or scratch its hide. Such a guy wire is normally designed to perform its intended function under static conditions or under wind loads which may be applied to the spaced poles and connecting lines but is not usually designed to be subject to high loads which may be applied by a heavy animal. The load applied by the animal may, moreover, be periodic which can induce harmonic oscillations in a pole and its swaying may produce undesired forces which may loosen or rupture the anchors at the ends of the guy wires. Also, the swaying of the line wires between poles is undesirable since it may produce short circuits or cause rupture of the lines wires.

To obviate contact with a guy wire by an animal, guards have been proposed, which in effect, serve a purpose similar to a barb wire fence in that they form deterrents for the animal against contacting same. Such a device is disclosed in Pat. 3,362,115 to Nyhus et al. in which a spirally split tube having barbs on same is affixed to a guy wire against longitudinal and rotational movement and without disturbing its anchored ends. The latter, of course, is obviously desirable to obviate disconnecting one anchor of the guy wire and the labor entailed therewith for threading the tubular guard onto the guy wire. As will subsequently appear, the present invention employs this feature of application of a guard to a guy wire, without disturbing the guy wire anchors, but differs in construction, one of the features being that it is freely rotatable on the guy wire so that rotation of same by the animal will successively contact barbs about its periphery with the hide of the animal.

SUMMARY OF THE INVENTION

A guy wire animal guard characterized by a two-part construction in which semi-circular spaced ends of each part are joined by longitudinal rods having barbs on same, the semi-circular ends being secured together by removable clamps which permit application of the guard to the guy wire without disturbing its anchored ends. A thrust washer is provided at one end of the guard for engagement with a guy wire clamp, or other abutment, to permit the guard to freely rotate on the guy wire to thereby cause sequential engagement of its peripherally spaced barbs with the animal's hide as it moves relative to the guard.

A principal object of the invention is thus to provide a guy wire animal guard which is formed in at least two parts which may be clamped together after application to the guy wire.

Further objects, advantages, and salient features will become more apparent from the detailed description to follow, the appended claims, and the accompanying drawing to now be briefly described.

BRIEF DESCRIPTION OF THE DRAWING

FIG. 1 is an elevation depicting an exemplary environment in which the subject of the invention may be employed.

FIG. 2 is an enlarged elevation, in the direction of arrow 2, FIG. 1, illustrating the subject of the invention, FIG. 3 is a section taken on line 3—3, FIG. 2, FIG. 3A is a like section of an alternative form of the invention, FIG. 4 is a section taken on line 4—4, FIG. 2, FIG. 5 is a section taken on line 5—5, FIG. 2, and FIG. 6 is a section taken on line 6—6, FIG. 2.

DESCRIPTION OF PREFERRED EMBODIMENT

Referring now to the drawing and first to FIG. 1, the subject of the invention comprises a guard 10, rotatably supported by the lower end of a guy wire 12 which braces a line pole 14, the guy wire being disposed in a pasture or the like containing animals, such as cattle, which seek structures against which they may scratch or ruff their hides.

Referring now to FIGS. 3 to 6, the guard is formed in two halves, each having semi-circular spaced supports 16, 16 and 18, 18, these being formed from ordinary steel pipe which has been longitudinally split or cut into identical halves. As best shown in FIG. 4, a pair of longitudinally extending circular rods 20, 20 are welded at their ends to one of supports 16 and at their other ends to a like support 18. When the two halves are assembled around guy wire 12 rods 20 are angularly disposed 90° apart.

Each rod 20 is provided with longitudinally spaced staples 22, the bight portions 23 of each extending around the innermost portion of a rod and its legs 24 extending generally radially outward, terminating in pointed sharp barbs or ends 26. The staples may be secured to the rods in any suitable manner such as by spot or otherwise welding same.

Paired support ends 16, 16 and 18, 18 may be secured together in any suitable manner, exemplary constructions being illustrated in FIGS. 3 and 3A. In FIG. 3 a hose clamp 28 is illustrated, this being either the conventional worm type in which a rotatable worm, carried by one end, engages a plurality of spaced slots in the clamp band or of the type having ears 30, 30 which are drawn toward each other by a screw 32. As is well known, either type may be opened so that it may be disposed in encircling relation about an object, after which its ends may be connected together and shortened circumferentially to effect clamping action. FIG. 3A is similar to FIG. 3 except that in lieu of the hose clamp, radially projecting ears 30a are provided on semi-circular supports 16a which are drawn toward each other by a pair of screws 32a, 32a, such as inexpensive stove bolts or the like. In view of the relative high cost of commercial hose clamps, the construction of FIG. 3A is preferred.

Referring now to FIGS. 2 and 6, the lower pair of semi-circular support ends 18, 18 are preferably provided with a thrust washer formed in two parts 34, 34 each of which is welded to a support end 18. The lower annular end of the assembled thrust washer engages an abutment 36 on guy wire 12, such as a cable connecting clamp, and permits the assembly to freely rotate on the guy wire.

As best shown in FIG. 2, the staples 22 on each rod 20 are longitudinally spaced relative to the staples of an adjacent rod 20, this staggered relationship being preferred to provide increased probability that a larger number of barbs will be engaged by the animal as the guard rotates.

Thrust washer halves 34, 34, while illustrated as substantially flat, are preferably bowed slightly so that the two halves form a convex surface engageable with cable clamp 36 to minimize friction and permit the cattle guard to more freely rotate on the guy wire.

What is claimed is:

1. An animal guard in combination with a line pole guy wire, comprising:
   (a) an elongated member formed in a plurality of like parts,
   (b) each part comprising at least one elongated rod having longitudinally spaced outwardly directed barbs thereon,
   (c) said rod being affixed to at least two longitudinally spaced support members, each constructed to partially surround the wire, and
   (d) means for clamping said support members together, whereby they substantially surround the wire.

2. A guard in accordance with claim 1 wherein said elongated member is formed in two parts and each of said support members surrounds substantially one half of the periphery of the wire.

3. A guard in accordance with claim 1 wherein each of said support members is provided with an arcuate inner surface for engaging the wire.

4. A guard in accordance with claim 1 wherein each of said support members is provided with outwardly projecting ears at its ends, and screws or the like extending between adjacent ears, securing same together.

5. A guard in accordance with claim 1 wherein each of said support members is provided with an arcuate outer surface, and an encircling clamp, such as a hose clamp, securing said support members together.

6. A guard in accordance with claim 1 wherein said support members are of a size to permit the guard to rotate on the wire.

7. A guard in accordance with claim 6 including a thrust washer disposed between one end of same and an abutment on the wire.

8. A guard in accordance with claim 7 wherein said thrust washer is formed as two arcuate halves, one being affixed to each support member affixed to one end of the guard.

9. A guard in accordance with claim 1 wherein said barbs are formed on ends of U-shaped staples, the bight of each staple being disposed adjacent an inner portion of a rod, the legs extending outwardly thereabout and beyond an outer portion of same.

10. A guard in accordance with claim 9 wherein each rod is circular in cross section and the bight of each staple is arcuate to conform with same.

11. An animal guard for use on a line pole guy wire or the like, comprising:
   (a) an elongated member formed in a pair of like parts,
   (b) each part having a semi-circular member at each end of same, the aforesaid semi-circular members being connected by a pair of angularly spaced circular rods,
   (c) a plurality of longitudinally spaced U-shaped barbed staples affixed to each rod,
   (d) each staple having an arcuate bight portion engaging an inner portion of a rod, with the legs extending thereabout and beyond an outer portion of same,
   (e) a semi-circular thrust washer portion affixed to each semi-circular member at one end of each of said like parts, and
   (f) means for securing each pair of the semi-circular members together,
   (g) the construction and arrangement being such that said semi-circular thrust washer portions form an annular thrust washer engageable with an abutment on said wire to permit the guard to freely rotate on same, said rods being disposed around the support in substantially equi-angularly spaced relationship, the engagement of one or more barbs on a rod, by movement of an animal relative thereto, adapted to rotate the guard on the wore and effect engagement of barbs on an adjacent rod with the animal, whereby all circumferentially disposed barbs at any portion of the guard are effective to engage the animal when it moves relative thereto and rotates the guard.

12. A guard in accordance with claim 11 wherein the spaced staples on one rod are longitudinally staggered relative to staples on an adjacent rod.

References Cited

UNITED STATES PATENTS

| | | | |
|---|---|---|---|
| 805,537 | 11/1905 | Gilbert | 287—111 |
| 864,034 | 8/1907 | Rudderow | 287—111 |
| 1,546,507 | 7/1925 | Pegorik | 287—111 |
| 3,362,115 | 1/1968 | Nyhus et al. | 52—101 |
| 3,378,968 | 4/1968 | Shoemaker | 52—155 |

FOREIGN PATENTS

| | | | |
|---|---|---|---|
| 546,957 | 5/1932 | France | 292—256.67 |
| 156,528 | 3/1939 | Germany | 52—101 |

FRANK L. ABBOTT, Primary Examiner

L. A. BRAUN, Assistant Examiner

U.S. Cl. X.R.

52—147; 287—118